(12) United States Patent
Sundberg et al.

(10) Patent No.: US 8,934,450 B2
(45) Date of Patent: Jan. 13, 2015

(54) MOBILE STATION WITH A SEMI-ACTIVE MODE

(75) Inventors: Krister Sundberg, Sollentuna (SE); Benny Lennartson, Hagersten (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 851 days.

(21) Appl. No.: 12/530,235

(22) PCT Filed: Mar. 8, 2007

(86) PCT No.: PCT/SE2007/050133
§ 371 (c)(1),
(2), (4) Date: Sep. 8, 2009

(87) PCT Pub. No.: WO2008/108696
PCT Pub. Date: Sep. 12, 2008

(65) Prior Publication Data
US 2010/0062771 A1     Mar. 11, 2010

(51) Int. Cl.
*H04W 4/00* (2009.01)
*H04B 17/00* (2006.01)
*H04W 48/20* (2009.01)
*H04W 76/02* (2009.01)
*H04W 88/02* (2009.01)

(52) U.S. Cl.
CPC .......... *H04B 17/0077* (2013.01); *H04W 48/20* (2013.01); *H04W 76/02* (2013.01); *H04W 88/02* (2013.01)
USPC ........... 370/331; 370/328; 370/332; 455/436; 455/439; 455/509

(58) Field of Classification Search
CPC ....................................................... H04W 4/00
USPC ........................................................ 370/331
See application file for complete search history.

(56) References Cited

U.S. PATENT DOCUMENTS

| 5,966,657 | A | * | 10/1999 | Sporre | 455/425 |
| 6,542,730 | B1 | * | 4/2003 | Hosain | 455/410 |
| 2002/0052196 | A1 | * | 5/2002 | Padawer et al. | 455/414 |
| 2004/0077383 | A1 | * | 4/2004 | Lappetelainen et al. | 455/574 |
| 2004/0087315 | A1 | * | 5/2004 | Dufva et al. | 455/456.1 |
| 2004/0171400 | A1 | * | 9/2004 | Rosen et al. | 455/518 |
| 2005/0009548 | A1 | * | 1/2005 | Kelley et al. | 455/509 |
| 2005/0096053 | A1 | * | 5/2005 | Liu et al. | 455/439 |
| 2005/0272425 | A1 | * | 12/2005 | Amerga et al. | 455/436 |
| 2006/0111110 | A1 | * | 5/2006 | Schwarz et al. | 455/439 |
| 2007/0097914 | A1 | * | 5/2007 | Grilli et al. | 370/329 |

FOREIGN PATENT DOCUMENTS

GB     2326564 A     12/1998

* cited by examiner

*Primary Examiner* — Ayaz Sheikh
*Assistant Examiner* — Hai-Chang Hsiung
(74) *Attorney, Agent, or Firm* — Coats & Bennett, P.L.L.C.

(57) ABSTRACT

In a mobile station for use in a cellular radio system, the mobile station is adapted to increase radio measurements relating to the currently best cell at times when the user is preparing to set up a call in order to increase the likelihood that a mobile station is camping in the correct cell when setting up a call. This is obtained by adding a third mode to the already existing idle and active modes. The additional mode provides for an increased amount of idle mode measurements compared to the conventional idle mode.

10 Claims, 3 Drawing Sheets

MOBILE STATION WITH A SEMI-ACTIVE MODE

TECHNICAL FIELD

The present invention relates to a mobile station and a method for use in a cellular radio system.

BACKGROUND

In a cellular radio system mobile stations connect to a base station in order to establish a connection with the cellular radio system. As a part of the procedure to establish the connection the mobile station goes from an idle mode to an active mode.

This procedure, usually termed call is setup, includes the step of identifying the base station currently best suited to handle the connection. The base station best suited is normally the base station currently providing the strongest signal to the mobile station. Hence during a typical call setup, the mobile station retrieves information about the base station that provides the strongest signal.

The 3GPP standard for GSM requires that the mobile station when in idle mode decodes the Base Station Identity Code BSIC information which is broadcast on the SCH channel. When the mobile station is in idle mode it should decode the BSIC every 30 seconds in order to i.a. keep track of the base station providing the strongest signal, see also 3GPP spec. 45 008.

Moreover, the mobile in idle mode shall continue to monitor all BCCH carriers as indicated by the BCCH allocation (BA-list). This is done by measuring and running average of received signal level (RLA_C) which is updated once every Max {5 s, five consecutive paging blocks of that MS}. At least 5 received signal level measurement samples are required per RLA_C value.

This means that in a worst case only 5 measurements per frequency is performed during the RLA_C period which can be up to typically 10 seconds. This time period is defined in 45.008 accordingly:

Consequently it is a likely scenario that the signal strength measurements will only be updated 5 times every $10^{th}$ second per frequency.

One reason for not performing more frequent BSIC decoding and signal strength measurements is that this would increase the power consumption and hence reduce the battery life time of the mobile station.

Due to the relatively relaxed requirement on the BSIC decoding frequency, i.e. once every 30 seconds and the relaxed requirement on the signal strength measurements, a mobile station may not set up the call during call set-up using the base station providing the strongest signal. The problem becomes even worse if the mobile station is traveling at a high speed, such as when a person is riding on a train or in a bus, because then the best base station may be shifting at a high rate indeed.

If a mobile station tries to set up a call to base station not providing the strongest signal, then there is a risk that the call could be dropped. This is particularly the case when the mobile station is traveling away from a base station that the mobile station tries to set up the connection to.

Hence, there exist a need for a mobile station and a method that minimizes the risk for dropping a call during a call set-up, and which mobile station and method does not increase the power consumption in the mobile stations.

SUMMARY

It is an object of the present invention to overcome or at least reduce some of the problems associated with the risk of dropping calls in a cellular telecommunications network during call set-up.

It is another object of the present invention to provide a mobile station and a method that is capable of performing an accurate determination of which base station that currently provides the strongest signal during a call set-up procedure in a cellular radio network.

It is yet another object of the present invention to provide a mobile station and a method that is capable providing a low risk of dropping a call during call set-up in a cellular radio network without increasing the power consumption in the mobile station.

These objects and others are obtained by the mobile station and the method as set out in the appended claims. Thus, in order to increase the likelihood that a mobile station is camping in the correct cell when setting up a call, the mobile station is adapted to increase radio measurements relating to the currently best cell at times when the user is preparing to set up a call. This is obtained by adding a third mode to the already existing idle and active modes. The additional mode provides for more frequent idle mode measurements compared to the conventional idle mode. Hence, while in the additional semi active mode, the mobile station is adapted to perform more frequent measurement on all frequencies in the measurement list than in the normal idle mode.

To enter the mode where an increased amount of idle mode measurements is performed a number of different triggers can be utilized. Examples of such triggers include, the user browsing in the phone book, starting to dial a telephone number or prepares to dial a telephone number in any other manner such as looking at missed telephone calls or opens an SMS.

If the mobile station has been in the mode with an increased amount of idle mode measurements without entering the active mode for a period of time, i.e. a call set-up does not take place within a certain time period, the mobile station returns to a normal idle mode and performs idle mode measurements accordingly.

For GSM, the measurement list is called CA list and the measurements includes measuring signal strength and decoding the Base Station Identity Code BSIC on neighboring cells and the strongest cell. The present invention can also be applied for other technologies than GSM. The technique is applicable on all radio technologies that allow the user equipment to enter an idle mode state. Examples of such technologies providing for an idle mode comprise Global System for Mobile communication (GSM), Wideband Code Division Multiple Access (WCDMA), Long Term Extension (LTE), Wireless Local Area Network (WLAN), and Wideband Interoperability for Microwave Access (WiMAX).

Because one reason for the idle mode state is that it reduces the battery consumption, the semi active mode should preferably be a temporary state that after some time is converted back to the idle mode if not followed by any further activity, such as establishment of a call.

The invention will significantly reduce the amount of failures or dropped calls at call setup, as it ensures that the mobiles are connected to the strongest cell at call setup. It will also reduce the amount of cell re-selection in during packed data transfers. By minimizing the number of calls connected to non-strongest cells will have a positive effect on the overall interference level.

BRIEF DESCRIPTION OF THE DRAWINGS

The present invention will now be described in more detail by way of non-limiting examples and with reference to the accompanying drawings, in which.

DETAILED DESCRIPTION

Figure 1:
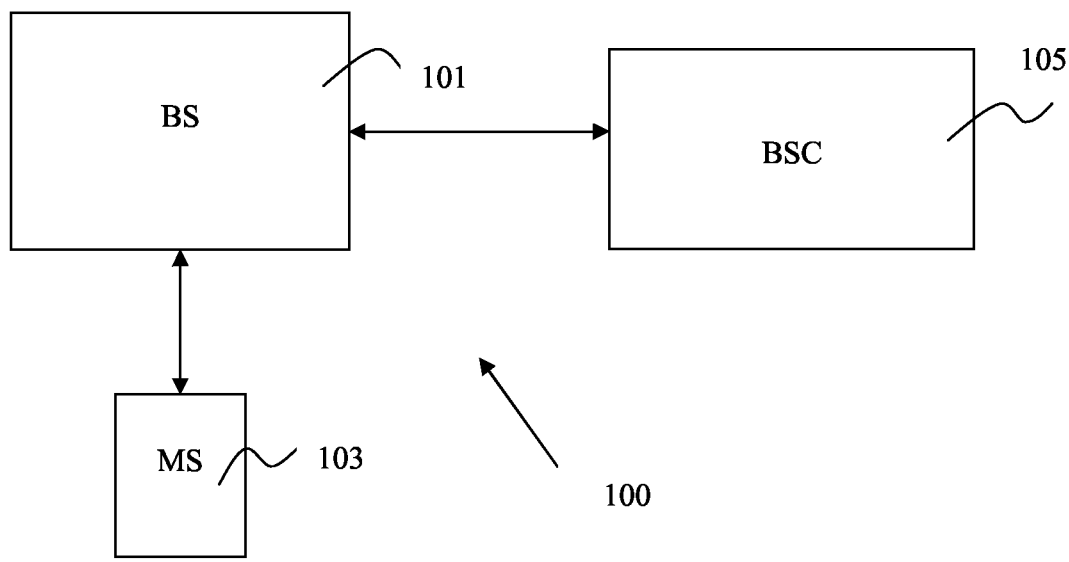
FIG. 1 is a general view of a cellular radio system.

In FIG. 1, a general view of a radio network system 100 covering an area is depicted. In the exemplary embodiment depicted in FIG. 1, the radio network system is a GSM system. The GSM system 100 comprises a base station (BS) 101. The base station 101 serves a number of mobile terminals; usually termed Mobile stations (MS) 103, located within the area covered by the base station 101. The base station 101 is also connected to a Base Station Controller (BSC) 105. The base station 101 and BSC 105 are both part of the Base Station Subsystem (BSS) The Base Station Subsystem (BSS) is the section of a GSM network which is responsible for handling traffic and signaling between a mobile phone and the Network Switching Subsystem. The BSS carries out transcoding of speech channels, transporting packet switched data, allocation of radio channels to mobile phones, paging, quality management of transmission and reception over the Air interface and many other tasks related to the radio network including transmitting the Base Station Identity Code BSIC information as a broadcast message on the SCH channel.

Due to the relatively relaxed requirement on the BSIC decoding frequency, i.e. once every 30 seconds, a mobile station may not set up the call during call set-up using the base station providing the strongest signal if the mobile station has moved since the last decoding of the base Station Identity Code BSIC information. The problem becomes even worse if the mobile station is traveling at a high speed, such as when a person is riding on a train or in a bus, because then the best base station may be shifting at a very high rate indeed.

The relaxed BSIC decoding requirements can result in that the mobile station is performing signal strength measurements on the wrong cell. If the BCCH frequency planning is such that it is possible for a mobile station to do signal strength measurements on 2 different cells that are using the same BCCH frequency, within 30 seconds then it is possible that the mobile station performs an access to a less preferred cell.

The relaxed requirement on the signal strength measurements is another source for setting up a call in the wrong cell. In case the radio environment is changing due to high speed or similar, it is common problem that the mobile does not set up the call on the strongest cell.

If a mobile station tries to set up a call to base station not providing the strongest signal, then there is a risk that the call could be dropped. This is particularly the case when the mobile station is traveling away from a base station that the mobile station tries to set up the connection to.

In order to reduce the likelihood of dropping a call during call set-up the mobile station is adapted to employ two types of idle modes. Hence, there is a conventional first idle mode that is used most of the time when the mobile station is not connected to a base station, i.e. in an active mode, and a second mode that is entered when there is an increased likelihood that the mobile station is to set up a call to within the near future. This is described more in detail below in conjunction with FIG. 2.

Figure 2:
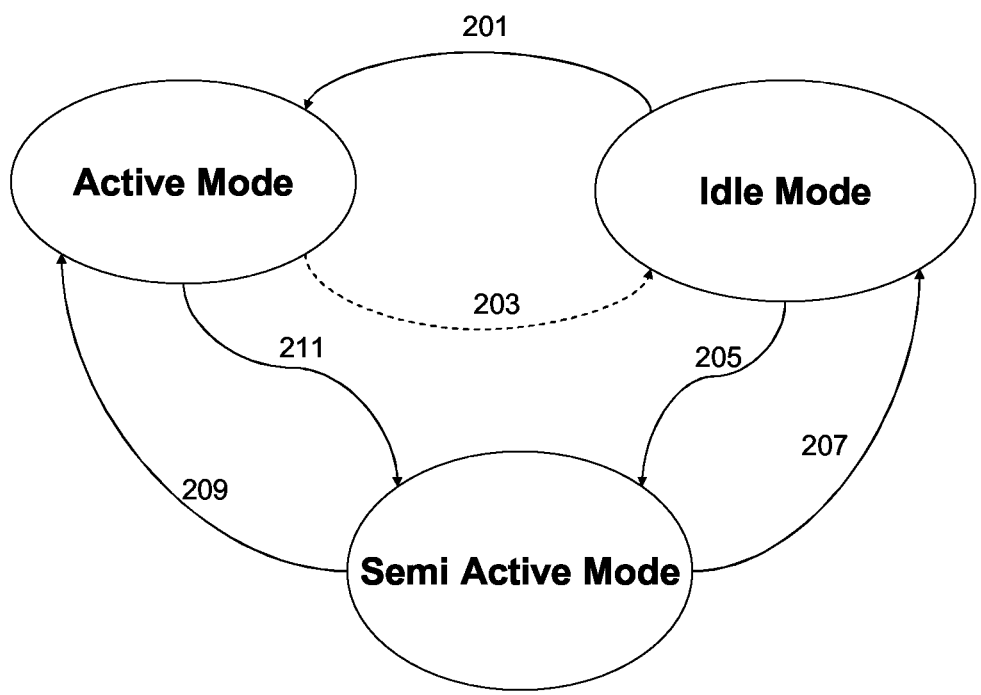
FIG. 2 is a view illustrating different modes of a mobile station.

In FIG. 2 different modes used by a mobile station are illustrated. To address the above described problem a "Semi Active" mode is introduced in addition to the Idle Mode and the Active Mode.

The normal state when not connected to a cellular radio system for the mobile station is the idle mode. If while the mobile station is in the idle an incoming call is received by the mobile station, the mobile station will transit directly from an idle mode to an active mode as indicated by the arrow 201. In a preferred embodiment this is the only event triggering a transition directly from the idle mode to the active mode.

Furthermore, when the mobile station is in the active mode and a connection to the cellular radio network is terminated, the mobile station can transit directly from the active mode to the idle mode as indicated by arrow 203. However, in a preferred embodiment the transition from the active mode to the idle mode is via a third mode denoted "semi-active" in FIG. 2. The transition via the semi-active mode is described below.

If, while in the idle mode the user of the mobile station initiates some pre-determined activity, such as pushing a button on the mobile station or starts to enter a telephone number on the mobile station or opens the telephone book with stored telephone numbers, the mobile station will transit to a "semi-active" mode as indicated by arrow 205. The semi active mode is a mode where the mobile station performs radio measurements as in the idle mode. However, the radio measurements are performed more often than is the case in the idle mode.

For example in a GSM system the BSIC decoding is typically performed at least every 30 seconds when in the idle mode in accordance with the requirements of the GSM standard. In the semi active mode, radio measurements can be performed every 5 seconds or even more often if that is determined to be advantageous such as every 3 seconds or even more often than that.

Furthermore, the signal strength measurements rate can also be increased when the mobile station is in the semi active mode. This can be done by updating the running average of received signal level (RLA_C) more than once every 5 seconds, e.g., once every second. In addition, more than 5 received signal level measurement samples can be required per RLA_C value, e.g. 20.

Also, in accordance with 3GPP Specification 45.008 the mobile station is required to perform the following measurements to ensure that the path loss criterion to the serving cell is acceptable.

At least every 5 s the MS shall calculate the value of C1 and C2 for the serving cell and re-calculate C1 and C2 values for non serving cells (if necessary). The mobile station shall then check whether:

i) The path loss criterion (C1) for current serving cell falls below zero for a period of 5 seconds. This indicates that the path loss to the cell has become too high.

ii) The calculated value of C2 for a non-serving suitable cell exceeds the value of C2 for the serving cell for a period of 5 seconds, except;

a) in the case of the new cell being in a different location area or, for a GPRS attached MS, in a different routing area or always for a GPRS attached MS in GMM Ready state (A/Gb mode) or RRC-Cell_Shared state (Iu mode) in which case the C2 value for the new cell shall exceed the C2 value of the serving cell by at least CELL_RESELECT_HYSTERESIS dB as defined by the BCCH data from the current serving cell, for a period of 5 seconds; or b) in case of a cell reselection occurring within the previous 15 seconds in which case the C2 value for the new cell shall exceed the C2 value of the serving cell by at least 5 dB for a period of 5 seconds.

Thus, C2 shall be higher than C1 for 5 seconds for a cell-reselection to occur. However, while in semi active mode this time is reduced to a time period less than 5 seconds, e.g. 2 seconds or even less.

Furthermore if the mobile station has been in the semi active mode without entering the active mode and there have been no new events triggering the entrance to the semi active mode for some predetermined time interval, for example 3 minutes, then the mobile station is adapted to return to the idle mode as indicated by arrow 207.

However, if while in the semi active mode a command to set-up a connection to the base station, such as by the user pressing a cell button, the mobile station is adapted to transit from the semi active mode into the active mode as shown by the arrow 209. Also, after disconnecting the connection to the base station, the mobile station is preferably adapted to return to the semi active mode as indicated by the arrow 211. As an alternative the mobile station could return directly to the idle mode as described above.

Figure 3:
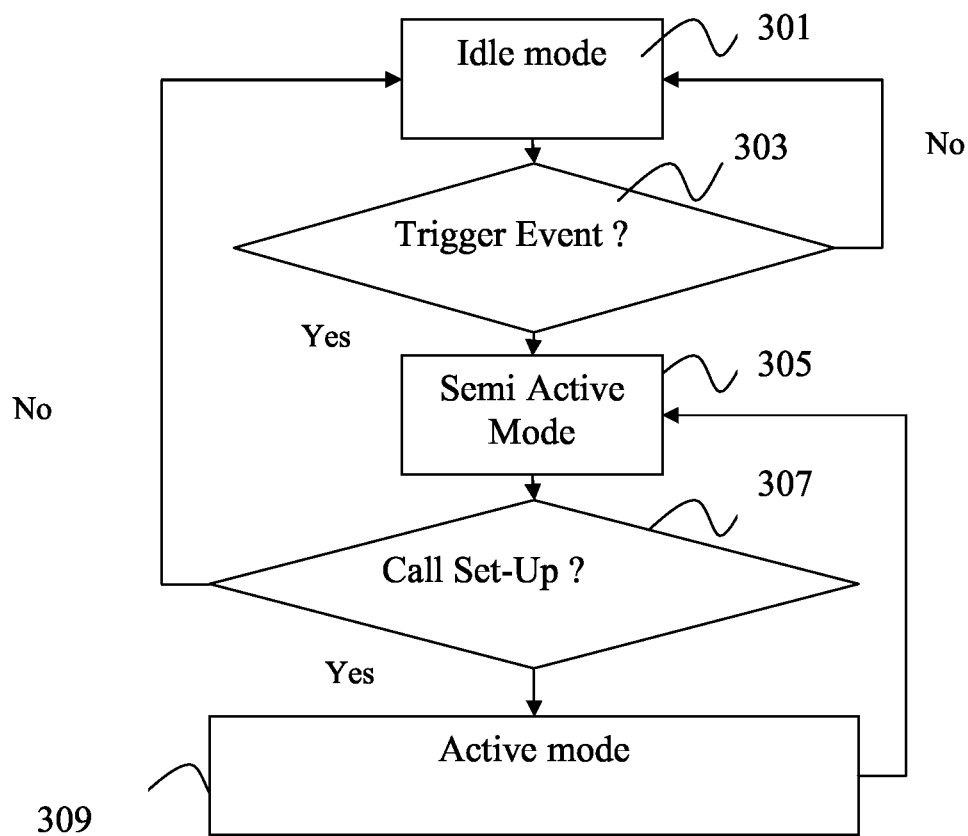
FIG. 3 is a flowchart illustrating different steps performed when switching between different modes in a mobile station.
Figure 4:
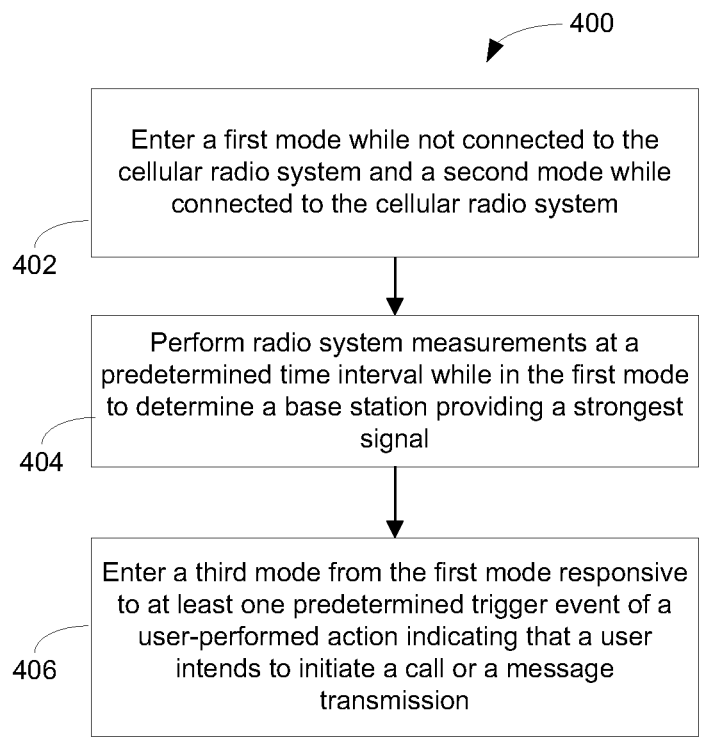
FIG. 4 is a flowchart illustrating a method of switching between different modes of operation in a mobile station for use in a cellular radio system.
Figure 5:
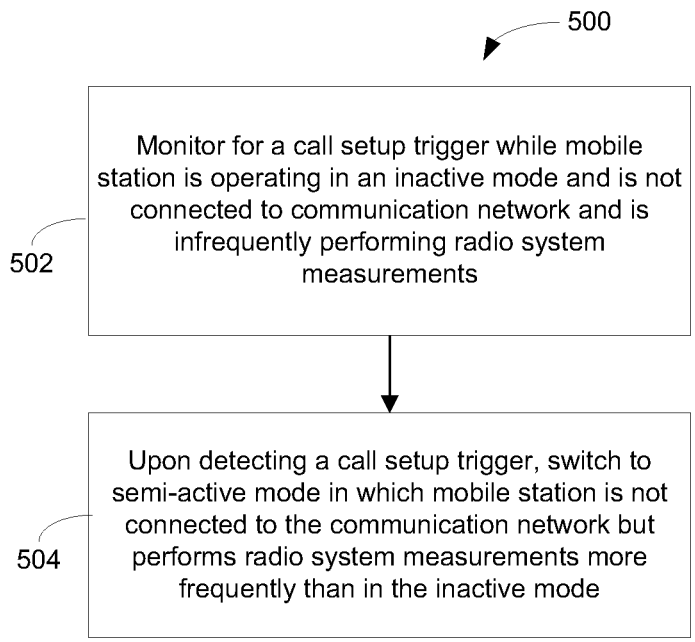
FIG. 5 is a flowchart illustrating a method of increasing the likelihood that a mobile station is camping in a correct cell of a communication network.

In FIG. 3, a flow chart illustrating a typical scenario when a user connects to a base station is shown. Thus initially the mobile station is in an idle mode as indicated by step 301. The mobile station then continuously executes a procedure where it checks if a trigger event has occurred step 303. A trigger event can be any type of event that has been set in the mobile station. Typically, a trigger event is an event that increases the likelihood that the mobile station will enter an active mode in the near future. Examples of such events include opening the Address List or entering a telephone number on a key pad on the mobile station.

If such a trigger event has not occurred, the mobile station remains in the idle mode. If however a trigger event has occurred, the mobile station enters a semi active mode as described above in conjunction with FIG. 2 and indicated at step 305. If while in the semi active mode the mobile station is given a command to set up a call as shown in step 307, the procedure described in conjunction with FIG. 3 will continue to a step 309. In step 309, the mobile station enters the active mode. If however while in the semi active mode no new trigger events are detected for some pre-set inactivity time or the procedure enters the active mode during the inactivity time, the procedure returns to step 301. After the connection with the cellular radio system shown by step 309 ends, the procedure returns to the step 305, i.e. the semi active mode.

By using the mobile station and the method as described herein, the amount of failures or dropped calls at call setup will be significantly reduced, because it is ensured or at least much more likely that a mobile station is adapted to connect to the cell providing the strongest signal at call setup.

Furthermore, the mobile station and the method as described herein will also reduce the amount of cell re-selection in during packed data transfers.

Finally, minimizing the number of calls set-up to non-strongest cells will have a positive effect on the overall interference level.

The invention claimed is:

1. A mobile station for use in a cellular radio system comprising a multitude of base stations, said mobile station being configured to:
    enter a first mode while not connected to the cellular radio system and a second mode while connected to the cellular radio system;
    perform radio system measurements on a plurality of the base stations at a predetermined time interval while in the first mode to determine a base station providing a strongest signal from said radio measurements; and
    enter a third mode from the first mode responsive to at least one predetermined trigger event comprising an action performed by a user of the mobile station indicating that the user intends to use the mobile station to initiate a call or a message transmission, wherein radio measurements are performed on the plurality of base stations more frequently in the third mode than in said first mode, and wherein the mobile station is also not connected to the cellular radio system in the third mode;
    wherein the mobile station supports a Global System for Mobile communication (GSM) standard; and
    wherein the mobile station is configured to perform Base Station Identity Code (BSIC) decoding in the third mode at least once every 5 seconds per frequency in a Broadcast Control Channel (BCCH) allocation (BA-list).

2. The mobile station according to claim 1, wherein the mobile station is adapted to enter the third mode from the second mode after disconnecting a connection to the cellular radio system.

3. The mobile station according to claim 1, wherein the mobile station is adapted to enter the first mode if having been in the third mode for a predetermined period of time without detection of a trigger event.

4. The mobile station according to claim 1, wherein the action indicating that a user of the mobile station intends to use the mobile station to initiate a call or a message transmission includes the user browsing a telephone book of the mobile station or the user dialing a telephone number on the mobile station.

5. The mobile station according to claim 1, wherein the mobile station also supports at least one of Wideband Code Division Multiple Access (WCDMA), Long Term Extension (LTE), Wireless Local Area Network (WLAN), and Wideband Interoperability for Microwave Access (WiMAX) standards.

6. A method of switching between different modes of operation in a mobile station for use in a cellular radio system including a multitude of base stations, said method comprising:
    operating in a first mode while not connected to the cellular radio system and in a second mode while connected to the cellular radio system;
    performing radio system measurements on a plurality of the base stations at a predetermined time interval while in the first mode, to determine a best base station to connect to;
    entering a third mode of operation from the first mode responsive to at least one predetermined trigger event comprising an action performed by a user of the mobile station indicating that the user intends to use the mobile station to initiate a call or a message transmission, wherein radio measurements are performed on the plurality of base stations more frequently in the third mode than in the first mode, and wherein the mobile station is also not connected to the cellular radio system in the third mode; and performing Base Station Identity Code (BSIC) decoding in the third mode at least once every 5 seconds per frequency in a Broadcast Control Channel (BCCH) allocation (BA-list);

wherein the mobile station supports a Global System for Mobile communication (GSM) standard.

7. The method according to claim 6, wherein the mobile station enters the third mode from the second mode after disconnecting a connection to the cellular radio system.

8. The method according to claim 6, further comprising entering the first mode if having been in the third mode for a predetermined period of time without detection of a trigger event.

9. The method according to claim 6, wherein the action indicating that a user of the mobile station intends to use the mobile station to initiate a call or a message transmission includes the user browsing a telephone book of the mobile station or the user dialing a telephone number on the mobile station.

10. The method according to 6, wherein the mobile station also supports at least one of Wideband Code Division Multiple Access (WCDMA), Long Term Extension (LTE), Wireless Local Area Network (WLAN), and Wideband Interoperability for Microwave Access (WiMAX) standards.

\* \* \* \* \*

UNITED STATES PATENT AND TRADEMARK OFFICE
CERTIFICATE OF CORRECTION

PATENT NO. : 8,934,450 B2  
APPLICATION NO. : 12/530235  
DATED : January 13, 2015  
INVENTOR(S) : Sundberg et al.

Page 1 of 1

It is certified that error appears in the above-identified patent and that said Letters Patent is hereby corrected as shown below:

On the Title Page, in the Figure, delete " 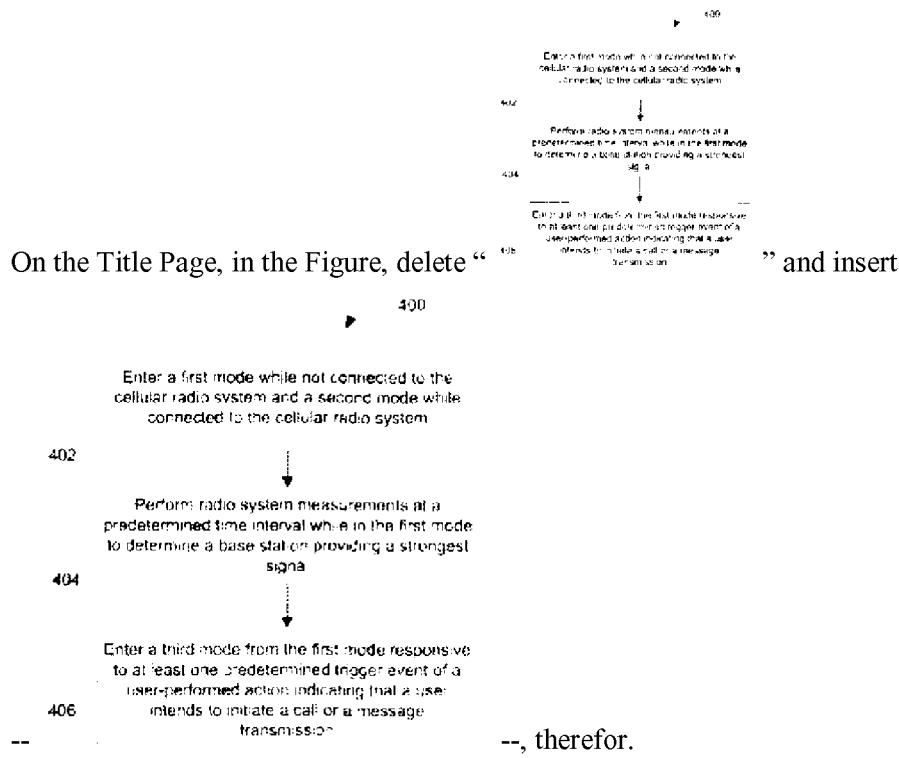 " and insert --, therefor.

In the Claims

In Column 7, Line 20, in Claim 10, delete "according to 6," and insert -- according to claim 6, --, therefor.

Signed and Sealed this  
First Day of March, 2016

Michelle K. Lee  
*Director of the United States Patent and Trademark Office*